United States Patent
Matsuyama

(10) Patent No.: US 9,746,759 B2
(45) Date of Patent: Aug. 29, 2017

(54) LIGHTING APPARATUS AND IMAGE PROJECTION APPARATUS FOR DETECTING LEAK LIGHT FROM A LIGHT EQUALIZER

(71) Applicant: Toshinobu Matsuyama, Kanagawa (JP)

(72) Inventor: Toshinobu Matsuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 16 days.

(21) Appl. No.: 14/923,785

(22) Filed: Oct. 27, 2015

(65) Prior Publication Data
US 2016/0131966 A1    May 12, 2016

(30) Foreign Application Priority Data
Nov. 11, 2014    (JP) .................. 2014-228846

(51) Int. Cl.
*G03B 21/20* (2006.01)
*H04N 9/31* (2006.01)
*G03B 21/14* (2006.01)

(52) U.S. Cl.
CPC ....... *G03B 21/208* (2013.01); *G03B 21/2046* (2013.01); *G03B 21/2053* (2013.01); *H04N 9/3155* (2013.01); *H04N 9/3194* (2013.01); *G03B 21/145* (2013.01)

(58) Field of Classification Search
CPC  G03B 21/2046; G03B 21/208; G03B 21/206; H04N 9/3152; H04N 9/3155
See application file for complete search history.

(56) References Cited

U.S. PATENT DOCUMENTS

| | | | | |
|---|---|---|---|---|
| 7,425,932 B2 * | 9/2008 | Monch | ................ | H04N 9/3114 345/7 |
| 7,828,449 B2 * | 11/2010 | Ho | ...................... | G03B 21/208 353/102 |
| 9,423,679 B2 * | 8/2016 | Magg | .................... | G01J 1/4257 |
| 2006/0028838 A1 * | 2/2006 | Imade | ................ | G02B 6/0001 362/602 |
| 2006/0097958 A1 * | 5/2006 | Monch | ................ | H04N 9/3114 345/55 |
| 2009/0015802 A1 * | 1/2009 | Ho | .................... | G03B 21/2046 353/102 |
| 2014/0185020 A1 * | 7/2014 | Magg | .................... | G01J 1/4257 353/87 |

FOREIGN PATENT DOCUMENTS

JP    2007-248752    9/2007
JP    2013-097123    5/2013

* cited by examiner

*Primary Examiner* — Bao-Luan Le
(74) *Attorney, Agent, or Firm* — Oblon, McClelland, Maier & Neustadt, L.L.P.

(57) ABSTRACT

A lighting apparatus to focus light emitted from a light source onto an image generation element includes a light equalizer to receive the light emitted from the light source, equalize the received light by reflecting the received light on an inner face of the light equalizer, and exit the equalized light, and a light detector disposed near the light equalizer to detect light intensity of leak light leaked from the light equalizer.

9 Claims, 10 Drawing Sheets

LIGHTING APPARATUS AND IMAGE PROJECTION APPARATUS FOR DETECTING LEAK LIGHT FROM A LIGHT EQUALIZER

This application claims priority pursuant to 35 U.S.C. §119(a) to Japanese Patent Application No. 2014-228846, filed on Nov. 11, 2014 in the Japan Patent Office, the disclosure of which is incorporated by reference herein in its entirety.

BACKGROUND

Technical Field

The present invention relates to a lighting apparatus, and an image projection apparatus.

Background Art

Image projection apparatuses known as projectors have been widely used for presentations, meetings, signage with the advancement of higher resolution of liquid crystal panels, enhancement of brightness of lamps having increased efficiency, and lower price.

Further, light-weight and compact image projection apparatuses employing digital light processing (DLP) using digital micro-mirror devices (DMD) as an image generation element have been widely used in offices, schools, and homes. Further, image projection apparatuses of short focus distance are developed. Further, the image projection apparatuses can employ various lamps as the light source such as an arc lamp (e.g., high pressure mercury lamp, xenon lamp).

As to an optical lighting system of the DLP image projection apparatus such as a lighting apparatus, a light tunnel having inner faces formed as mirror faces can be used as a light equalizer. Specifically, light emitted from the lamp is separated into a plurality of colors, and then guided into the inner faces of the light tunnel. The light is reflected on the inner faces in the light tunnel for a plurality of times, and then the light exits to the image generation element via a lens and a mirror to focus the light on the image generation element. In this configuration, the light axis of the light emitted from the lamp and guided to the light tunnel is aligned to the center axis of the light tunnel, or is deviated from the center axis of the light tunnel for some length.

Conventionally, the light tunnel and the lamp are fixed at respective positions when the image projection apparatus is assembled. For example, the light tunnel is assembled at a given position in the image projection apparatus, and the lamp is fixed in the image projection apparatus by abutting a fixing reference face of the lamp to a member for fixing the lamp in the mage projection apparatus.

Therefore, if the processing precision of one or more parts to be fixed with the lamp is low, and the fixing position of the lamp deviates from the light axis of the lamp used as a desired position, the light axis of the lamp and the light guiding direction of the light tunnel deviate, with which efficient utilization of light beam becomes lower, and desired brightness cannot be secured for projection images. Further, if the light axis of the lamp and the light guiding position of the light tunnel deviate, the light emitted from the lamp may hit optical parts disposed around the light tunnel, with which the optical parts may be overheated and damaged.

In view of this issue, image projection apparatuses employing the optical lighting system using the light tunnel are disposed with an adjustment mechanism at an exit end of the light tunnel to adjust the position and rotation angle of the light tunnel to adjust a light focusing position onto the image generation element, in which the light can be guided to a desired lighting area on the image generation element.

However, even if the adjustment mechanism of the light tunnel is employed, it cannot confirm whether utilization of light beam is at a desired efficient level, which means even when the light guiding direction of the light tunnel is adjusted, it cannot guarantee the efficient utilization of light beam.

Therefore, if the desired brightness cannot be set for projection images after adjusting the position and rotation angle of the light tunnel, a re-adjustment work is required. The re-adjustment work can be performed by re-assembling the lamp with a consideration to the abutting part and re-fixed, but even if the re-adjustment work is performed, it cannot identify a deviation level of the light beam. Therefore, the re-adjustment work becomes a try-and-error operation, which is a complex work for users. Further, if the desired light intensity is not output from the image projection apparatus, it is determined that the reduction of light intensity occurs due to the wrong positioning of the light tunnel and the lamp, and this determination leads to replacement of the lamp and other related optical parts. However, the situation may not be improved just by replacing the lamp and other parts.

SUMMARY

In one aspect of the present invention, a lighting apparatus to focus light emitted from a light source onto an image generation element is devised. The lighting apparatus includes a light equalizer to receive the light emitted from the light source, equalize the received light by reflecting the received light on an inner face of the light equalizer, and exit the equalized light, and a light detector disposed near the light equalizer to detect light intensity of leak light leaked from the light equalizer.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
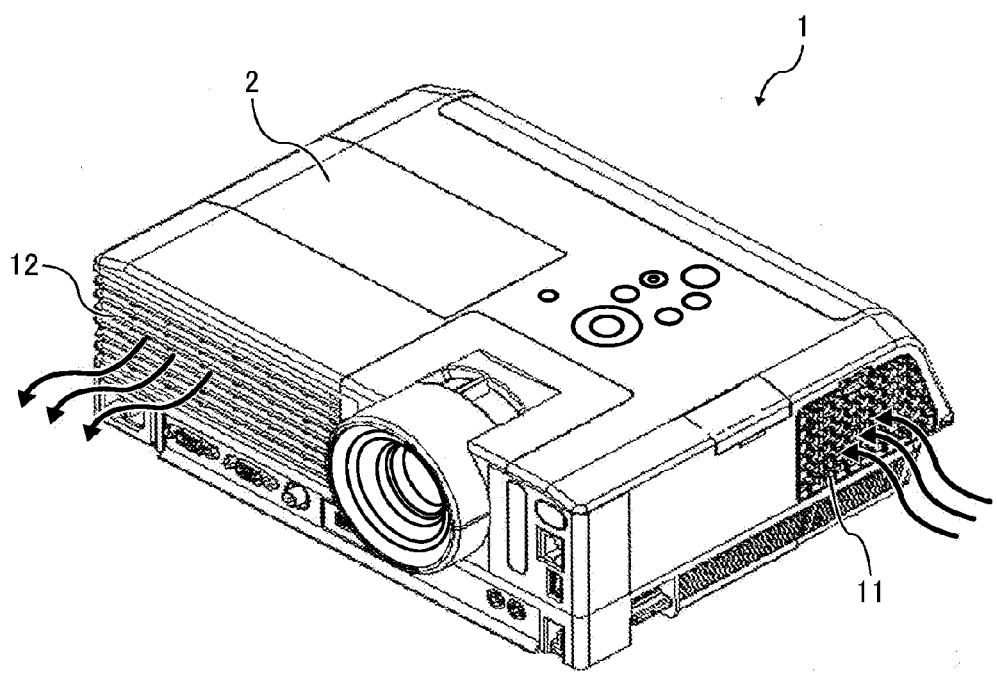
FIG. 1 is a perspective view of an image projection apparatus according to one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is now given of an image projection apparatus according to one or more example embodiments of the present invention with reference to drawings.

As to the one or more example embodiments of the present invention to be described below, the image projection apparatus includes a lighting apparatus such as a lighting unit (lighting unit 3a) that can focus light emitted from a light source (light source 20) onto an image generation element (image generation element unit 10, DMD element 10a), and the lighting apparatus includes a light equalizer (light tunnel 6) and one or more light detectors (first light sensor 25, second light sensor 26). When the light emitted from the light source enters into the light equalizer, the light is reflected on an inner face of the light equalizer for a plurality of times to equalize the light, and then the equalized light exits from the light equalizer. The light detector is disposed, for example, near the light equalizer to detect light intensity of leak light leaked from the light equalizer.

(Configuration of Image Projection Apparatus)

Figure 2:
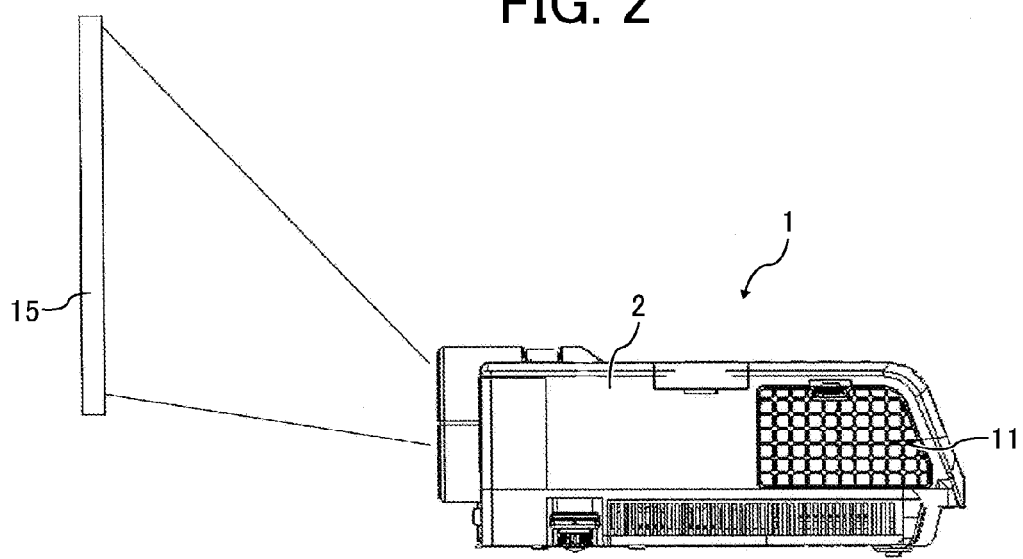
FIG. 2 is a side view of the image projection apparatus, and a projection condition of a projection image on a projection face.

FIG. 1 is a perspective view of an image projection apparatus 1 according to one or more example embodiments, and FIG. 2 is a side view of the image projection apparatus 1, and a projection condition of a projection image on a screen 15 used as a projection face. The image projection apparatus 1 is, for example, a projector that generates images based on image data input from an information processing apparatus such as a personal computer (PC), and an image capturing apparatus such as a video camera, and projects the generated images on the screen 15. The images may be generated from still image data and movie image data with or without audio data.

The image projection apparatus 1 includes, for example, the light source 20 such as a lamp, and a number of electronic circuits therein. Therefore, temperature inside the image projection apparatus 1 increases when the image projection apparatus 1 is activated. The image projection apparatus 1 includes an air-intake port 11 and an exhaust port 12 so that the temperature inside the image projection apparatus 1 does not exceed heat-resistance temperature of internal components of the image projection apparatus 1.

Figure 3A:
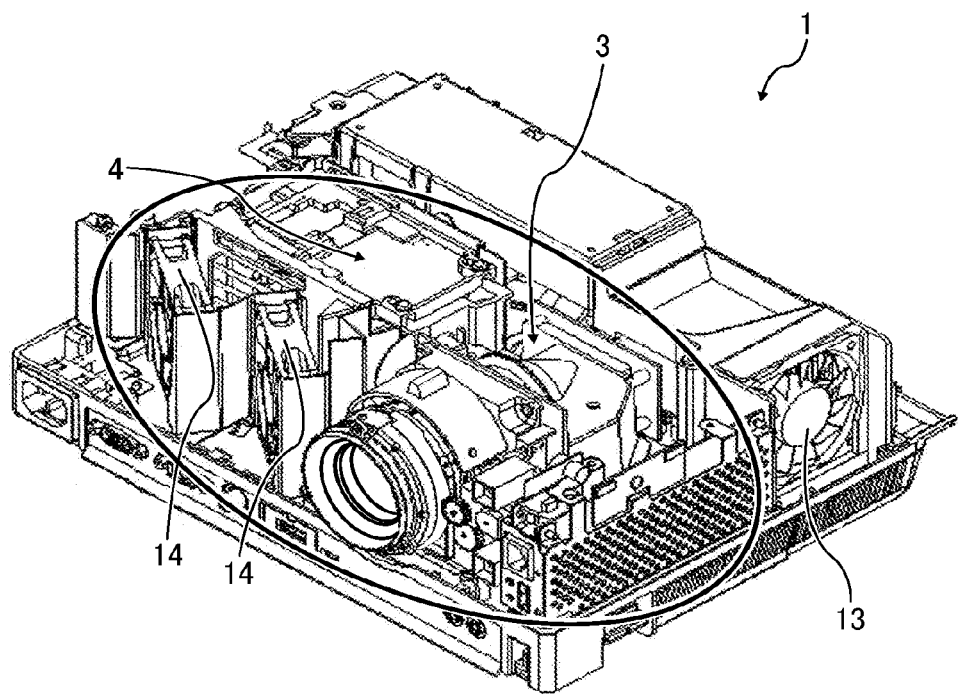
FIG. 3A is a perspective view of the image projection apparatus, in which an outer cover is removed to expose internal parts.
Figure 3B:
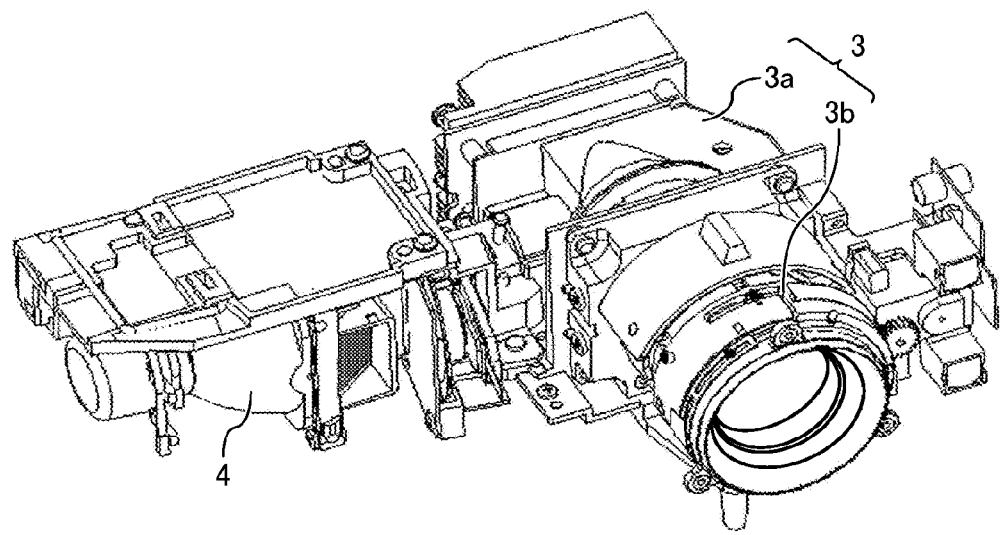
FIG. 3B is an expanded view of an optical engine and a light source unit indicated by a circular line in FIG. 3A.
Figure 4:
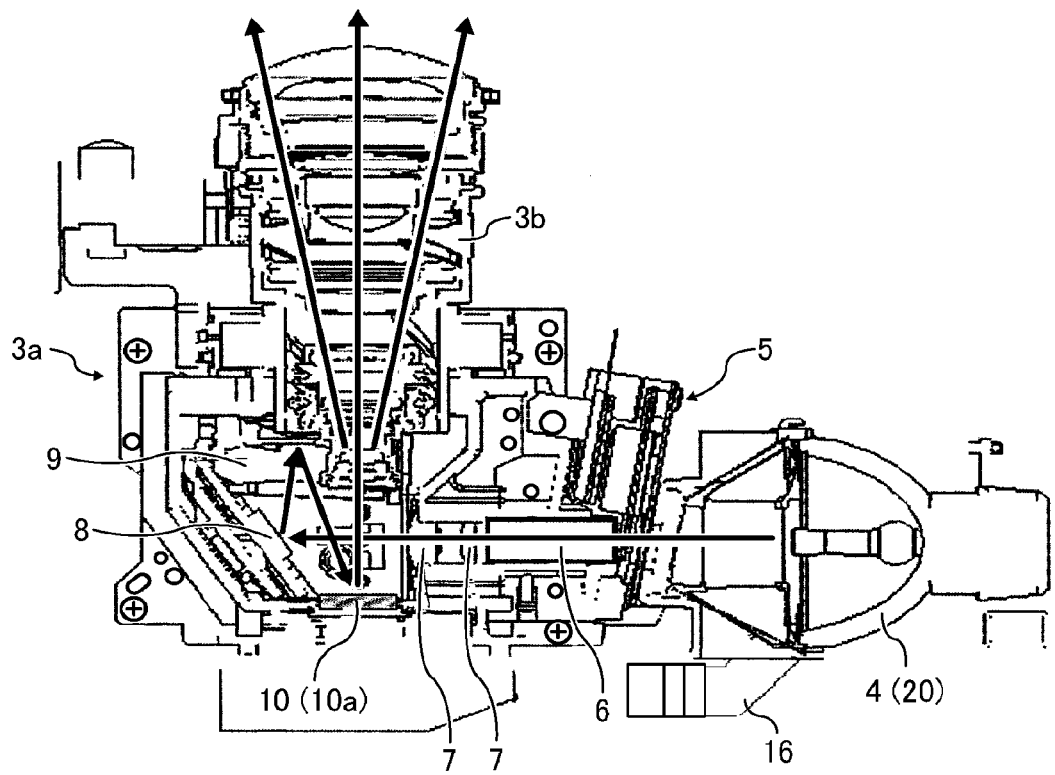
FIG. 4 is a schematic cross-sectional view of a lighting unit, a projection unit, and a light source unit viewed from the upper side of the image projection apparatus.

FIG. 3A is a perspective view of the image projection apparatus 1, in which an outer cover 2 is removed to expose internal parts of the image projection apparatus 1. Further, FIG. 3B is an expanded view of an optical engine 3 and a light source unit 4 indicated by a circular line in FIG. 3A. As illustrated in FIGS. 3A and 3B, the image projection apparatus 1 includes, for example, the optical engine 3 and the light source unit 4. Further, FIG. 4 is a schematic cross-sectional view of the optical engine 3 and the light source unit 4 viewed from the upper side of the image projection apparatus 1. As illustrated in FIG. 4, the optical engine 3 includes a lighting unit 3a used as an optical radiation system or apparatus having an image generation element unit 10, and a projection unit 3b used as an optical projection system or apparatus. As illustrated in FIG. 3A, an air-intake fan 13 is disposed inside the air-intake port 11, and an exhaust fan 14 is disposed inside the exhaust port 12. The inside of the image projection apparatus 1 can be cooled by forced air draft, which can be generated by in-taking air from the air intake fan 13 and exhausting the air from the exhaust fan 14.

As to the image projection apparatus 1, light (i.e., white light) emitted from the light source 20 of the light source unit 4 is irradiated to the lighting unit 3a of the optical engine 3. In the lighting unit 3a, the irradiated white light is separated into red, green and blue (RGB) light, and then guided to the image generation element unit 10 by using the optical radiation system including lenses and mirrors. The image generation element unit 10 generates an image based on modulated signals, and then the optical projection system or apparatus such as the projection unit 3b enlarges and projects the generated image onto the screen 15. The light source 20 of the light source unit 4 can employ various lamps such as an arc lamp (e.g., high pressure mercury lamp, xenon lamp). In this description, the light source 20 employs the high pressure mercury lamp.

Further, a cooling fan 16 is disposed at one side of the light source unit 4 as a cooling device for cooling the light source 20. The rotation speed of the cooling fan 16 is controlled at a given level to maintain temperature of each parts of the light source unit 4 within a given temperature range. Further, an exit direction of light coming from the light source unit 4 and an exit direction of imaging light exiting from the projection unit 3b are angled about 90-degree directions with each other as illustrated in FIG. 4.

(Configuration of Lighting Apparatus)

Further, the lighting unit 3a of the optical engine 3 includes, for example, a color wheel 5, a light tunnel 6, a relay lens 7, a flat-face mirror 8, and a concave-face mirror 9. The color wheel 5 separates the light emitted from the light source 20 when the color wheel 5 rotates in one direction. The light tunnel 6 guides the light exiting from the color wheel 5. Further, the lighting unit 3a includes the image generation element unit 10.

In the lighting unit 3a, the light emitted from the light source 20 is sequentially converted into RGB light for each unit time by the color wheel 5 having a disk shape rotating in one direction, and then the converted light exits from the color wheel 5. Then, the converted light exiting from the color wheel 5 is guided to the light tunnel 6 having a cylindrical shape composed of glass plates. The light tunnel 6 is used as the light equalizer, in which the light is reflected on an inner face of the light equalizer for a plurality of times to equalize the light.

Then, the light exiting from the light tunnel 6 is condensed by the relay lens 7 composed of two lenses while correcting chromatic aberration on the optical axis. Further, the light exiting from the relay lens 7 is reflected by the flat-face mirror 8 and the concave-face mirror 9, and is irradiated onto the image generation element unit 10. The image generation element unit 10 includes, for example, a digital micro-mirror device (DMD) element 10a used as an image generation element, which may be also referred to a light modulator or light modulation element. The DMD element 10a includes a plurality of micro mirrors shaping each of the mirrors as a rectangular mirror. Each of the micro mirrors is time-divisionally driven based on image data, with which the plurality of micro mirrors reflect the light to generate projection light used for generating a projection image.

Based on input signals, the image generation element unit 10 switches ON/OFF of the plurality of micro mirrors of the DMD element 10a to select light to be output to the projection unit 3b and set gradation values. Specifically, based on the time-divisional image data, the DMD element 10a having the plurality of micro mirrors reflects light used for projection (i.e., projection light) to a projection lens, and reflects light not used for projection to an OFF plate. The projection light reflects on the image generation element unit 10 is directed to the projection unit 3b, and then the projection light passing through a plurality of projection lenses in the projection unit 3b is enlarged and projected onto the screen 15.

Figure 5A:
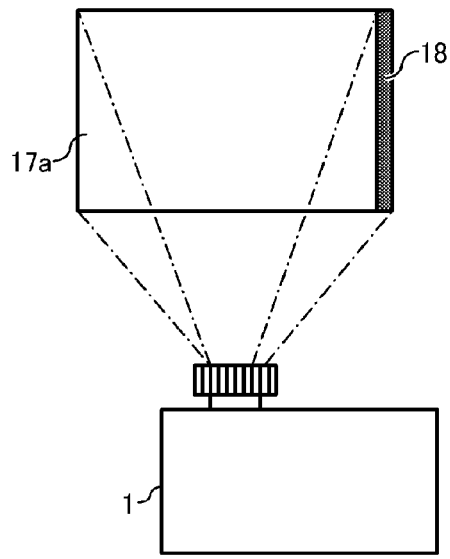
FIG. 5A is an example of a projection image occurring a vignetting at the right end of the projection image.
Figure 5B:
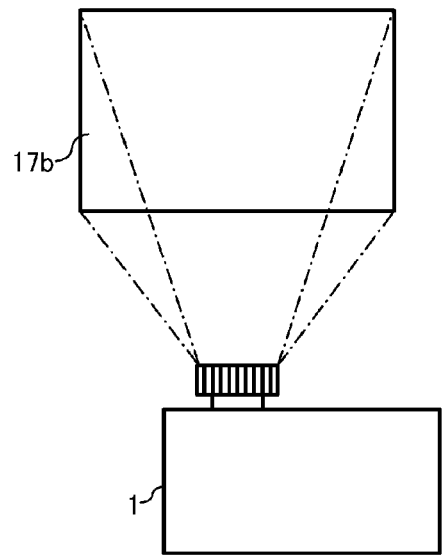
FIG. 5B is an example of a projection image without a vignetting.

FIG. 5 is an example of a projection image projected on a projection face from the image projection apparatus 1 using projection light, which may need an adjustment of the projection light used for projecting the projection image. In an example case of FIG. 5A, a vignetting 18 occurs at the right end of a projection image 17a being projected on the screen 15. As illustrated in FIG. 5A, the vignetting 18 may appear as a dark area in the projection image 17a. The vignetting 18 occurs when the light is not guided to a part of the image generation unit 10. FIG. 5B is an example of a projection image 17b without occurring the vignetting 18. The vignetting is also known as light fall-off, which means darkening of image corners when compared to the center.

Figure 6:
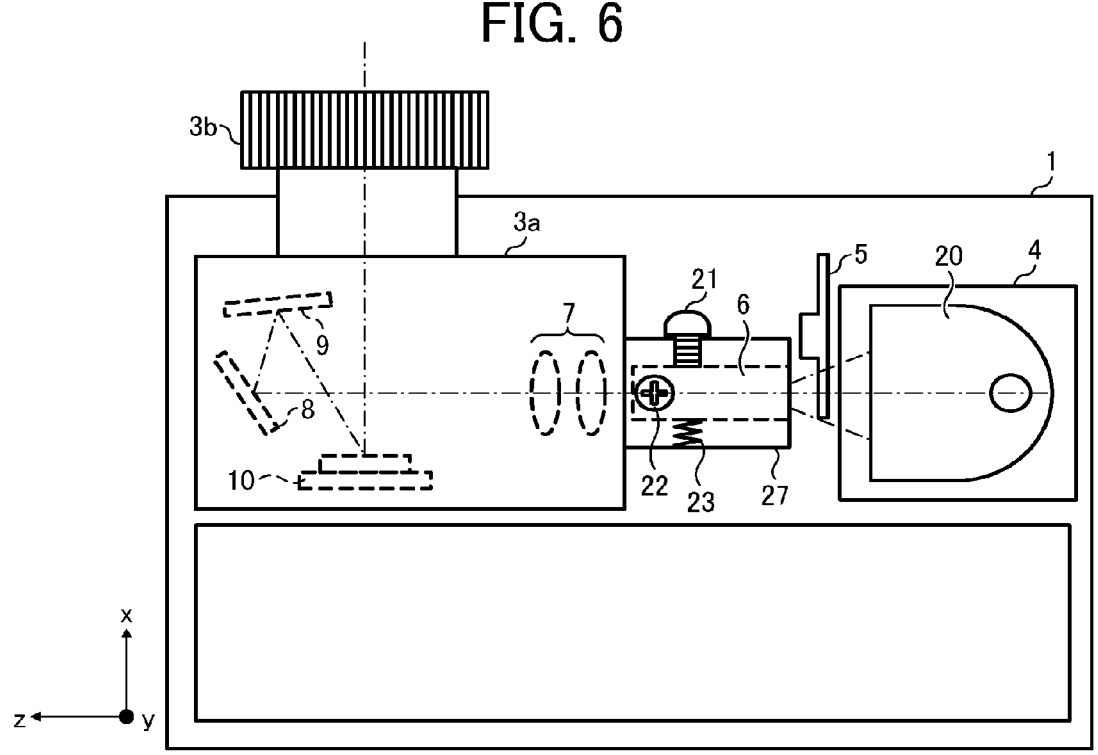
FIG. 6 is a schematic configuration of the image projection apparatus having the lighting unit disposed with a position adjustment unit for a light tunnel.

In view of the vignetting phenomenon on the projection image, the image projection apparatus 1 preferably includes a position adjustment unit or mechanism for the light tunnel 6. FIG. 6 is a schematic configuration of the image projection apparatus 1 having the lighting unit 3a disposed with the position adjustment unit for the light tunnel 6.

In this description, the light axis direction of the exit light exiting from the light source 20 is set as the "z" direction, the direction of one plane perpendicular to the light axis of the exit light is set as the "x" direction, and the direction of another plane perpendicular to the light axis of the exit light is set as the "y" direction, in which the "x, y, and z" directions are perpendicular to one to another.

Figure 7:
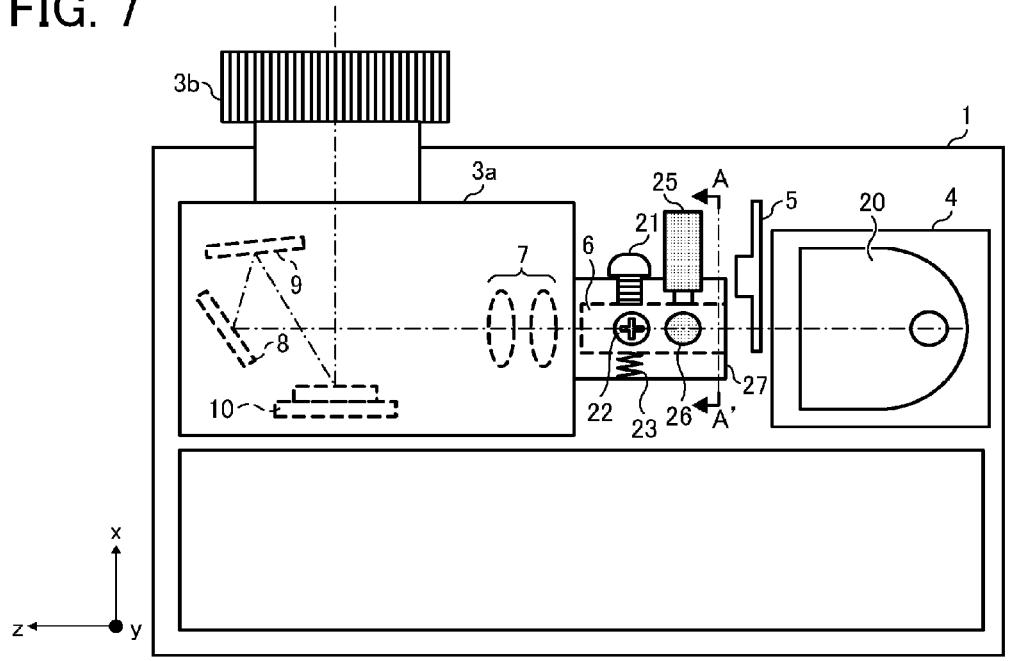
FIG. 7 is a schematic configuration of the image projection apparatus including the lighting unit disposed with the position adjustment unit and a light detector for the light tunnel.
Figure 8:
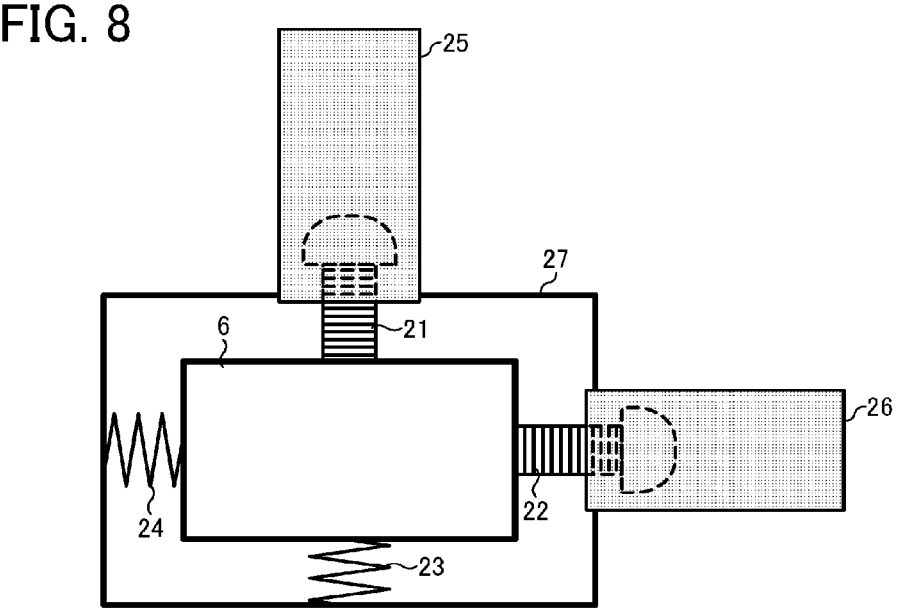
FIG. 8 is a cross-sectional view at A-A line of FIG. 7.

As illustrated in FIGS. 6 to 8, the position adjustment unit or mechanism can be disposed, for example, at an exit side of the light tunnel 6 to adjust a direction of light exiting from the light tunnel 6 and then irradiating onto the image generation unit 10. Specifically, the position adjustment unit or mechanism includes, for example, a first adjustment screw 21, a second adjustment screw 22, a first spring 23, and a second spring 24 (see FIG. 8). As illustrated in FIG. 6, the first adjustment screw 21, which can adjust a position of the light tunnel 6 along the x direction, is disposed at the exit side of the light tunnel 6, and the second adjustment screw 22, which can adjust a position of the light tunnel 6 along the y direction, is disposed at the exit side of the light tunnel 6.

Further, the first spring 23 (biasing member) such as a spring is disposed at an opposing position with respect to the first adjustment screw 21 by sandwiching the light tunnel 6, and the second spring 24 (biasing member) such as a spring is disposed at an opposing position with respect to the second adjustment screw 22 by sandwiching the light tunnel 6 (see FIG. 8). With this configuration, the position of the light tunnel 6 can be adjusted along the x and y directions by screwing and unscrewing the first adjustment screw 21 and the second adjustment screw 22 respectively along the x and y directions.

For example, when the first adjustment screw 21 is screwed toward the light tunnel 6, the light tunnel 6 and the first spring 23 are pushed, with which the light tunnel 6 can be moved. Further, when the first adjustment screw 21 is unscrewed from the light tunnel 6, the light tunnel 6 can be moved to a return direction by using elastic force of the first spring 23. The first spring 23 can be fixed on an outer supporter 27 (e.g., casing) of the light tunnel 6. Further, a holder that holds the light tunnel 6 can be disposed between the outer supporter 27 and the light tunnel 6, in which the first spring 23 can be fixed on the holder.

Further, when the second adjustment screw 22 is screwed toward the light tunnel 6, the light tunnel 6 and the second spring 24 are pushed, with which the light tunnel 6 can be moved. Further, when the second adjustment screw 22 is unscrewed from the light tunnel 6, the light tunnel 6 can be moved to a return direction by using elastic force of the second spring 24. The second spring 24 can be fixed on the outer supporter 27 (e.g., casing) of the light tunnel 6. Further, if the holder that holds the light tunnel 6 is disposed between the outer supporter 27 and the light tunnel 6, the second spring 24 can be fixed on the holder.

Further, in an example case of FIG. 6, the position adjustment unit composed of, for example, the first adjustment screw 21, second adjustment screw 22, first spring 23, and second spring 2 can be disposed at the exit side of the light tunnel 6, and the entry side of the light tunnel 6 is fixed, but not limited hereto.

The position adjustment unit can be disposed at any positions with respect to the direction of the light axis of the light tunnel 6. For example, the position adjustment unit can be disposed at one of the entry side and the exit side of the light tunnel 6, or can be disposed at both of the entry side and the exit side of the light tunnel 6. If the position adjustment unit is disposed at any one of the entry side and the exit side, slanting of the light tunnel 6 along the long direction of the light tunnel 6 can be adjusted by rotating the light tunnel 6 in one direction. Further, if the position adjustment unit is disposed at both of the entry side and the exit side of the light tunnel 6, the light tunnel 6 can be adjusted in a parallel direction by moving the light tunnel 6 in the parallel direction.

To eliminate the vignetting 18 (FIG. 5A), it is required to adjust at least one of the first adjustment screw 21 and the second adjustment screw 22 to irradiate the light onto an entire effective display area of the image generation unit 10. The vignetting 18 may occur at any sides of the projection image 17a such as the upper, lower, left and right end of the projection image 17a. A projection image without occurring the vignetting 18 can be obtained by adjusting the first adjustment screw 21 and/or the second adjustment screw 22 of the light tunnel 6 in view of the direction of the vignetting 18.

As to the position adjustment unit disposed in the lighting unit 3a of the image projection apparatus 1, the position of the light tunnel 6 can be adjusted along the x and y directions perpendicular to the light axis of the light source 20 based on the assumption of (1) the light axis of the light source 20 and the light tunnel 6 are fixed at positions in view of a level of processing precision and a level of assembly fluctuation of each of parts, and (2) the light tunnel 6 and the light source 20 are assembled at respective positions close to the positions designed for the image projection apparatus 1.

Since the light source unit 4 is fixed at a fixing part of a housing of the image projection apparatus 1, when the image projection apparatus 1 is assembled, it cannot confirm or check whether the positional relationship of the light axis of the light source unit 4 and the light axis of the light tunnel 6 is kept at a desired level that can secure efficient utilization of light beam. Further, even if the position of the light tunnel 6 is adjusted, it is difficult to determine whether the utilization of light beam is set at an optimal efficient level. Especially, when a size of an opening of the light tunnel 6 is too small, the light may not be guided to a correct position due to the assembly fluctuation, with which the lighting unit 3a generates the light having greater fluctuation.

Therefore, as to lighting unit 3a of the one or more example embodiments, a light detector such as a light sensor is disposed near the light tunnel 6 to detect light intensity of leak light leaked from the light tunnel 6.

The light tunnel 6 has an inner face composed of a plurality of reflection faces such as mirror faces coated with reflection material such as silver-coated face, and dielectric multilayer, in which the plurality of reflection faces such as four faces are opposed with each other, and each mirror face has a reflection ratio of about 97% to 98%. The light source 20 emits light having the light intensity of about 10,000 (lm) to 20,000 (lm) depending on the power level (W) of the light source 20. A part of the light passing through inside the light tunnel 6 is absorbed by the light tunnel 6 as reflection loss, and a part of the light passing through inside the light tunnel 6 penetrates through the reflection faces and radiates outside the light tunnel 6. The light detector detects this radiation light penetrating through the light tunnel 6.

Further, the light detector is disposed at a position that is not affected by ambient light, which is not the leak light leaked from the light tunnel 6. For example, the surrounding of the light tunnel 6 can be covered by the outer supporter 27, and thereby the ambient light does not enter the light tunnel 6 from the outside, which means the light tunnel 6 can be disposed in dark condition. Further, it is not required to cover the entire portion of the light tunnel 6. For example, it may be enough just cover only a part of surrounding of the light detector to block the effect of ambient light.

With this configuration, without receiving the effect of ambient light, the light detector disposed near the light tunnel 6 can correctly detect light radiated penetrating through the light tunnel 6 in the lighting unit 3a, with which light intensity of leak light can be measured correctly. The light detector is, for example, a light sensor such as a luminance sensor that can measure luminance, and has the wavelength sensitivity matched to the mirror reflection property of the light tunnel 6. The light sensor employs, for example, a photodiode or the like, FIG. 7 is a schematic configuration of the image projection apparatus 1 including the lighting unit 3a disposed with the position adjustment unit and the light detector for the light tunnel 6. Further, FIG. 8 is a cross-sectional view at A-A line of FIG. 7.

The number of the light sensors disposed in the image projection apparatus 1 can be one or more sensors. Preferably, one light sensor is disposed along in x direction of the light tunnel 6, and another one light sensor is disposed in the y direction of the light tunnel 6. In the one or more example embodiments, a first light sensor 25 is disposed near an upper side of the light tunnel 6, which is the +x direction, and a second light sensor 26 is disposed near a lateral side of the light tunnel 6, which is the −y direction. Further, the light sensor can be disposed in the light axis direction (z direction) at any positions near the light tunnel 6.

In an example case of FIG. 7, the light sensor is disposed at a position closer to the light source 20 compared to the position adjustment unit, but not limited hereto. Further, in an example case of FIG. 7, the positions of the first light sensor 25 and the second light sensor 26 are on the same circumference line with respect to the light axis direction of the light tunnel 6 as illustrated in FIG. 7, but not limited hereto. For example, the positions the first light sensor 25 and the second light sensor 26 can be deviated with each other with respect to the light axis direction of the light tunnel 6.

In an example case of FIG. 7, the light tunnel 6 is covered by the outer supporter 27, and the outer supporter 27 has a through hole for setting the first adjustment screw 21, and a through hole for setting the second adjustment screw 22. Further, the outer supporter 27 has a through hole for setting the first light sensor 25, and a through hole for setting the second light sensor 26. The configuration of the outer supporter 27 is not limited to the above configuration. For example, the outer supporter 27 can be configured any configurations that enable a movement of the light tunnel 6 by the position adjustment unit, and the light sensor to detect leak light leaked from the outer face of the light tunnel 6 without receiving the effect of ambient light.

When the light emitted from the light source 20 is passing through inside the light tunnel 6, the first light sensor 25 and/or the second light sensor 26 can detect leak light leaked from the light tunnel 6. Based on the detected leak light, it can determine whether the light emitted from the light source 20 has desired light intensity.

Figure 9:
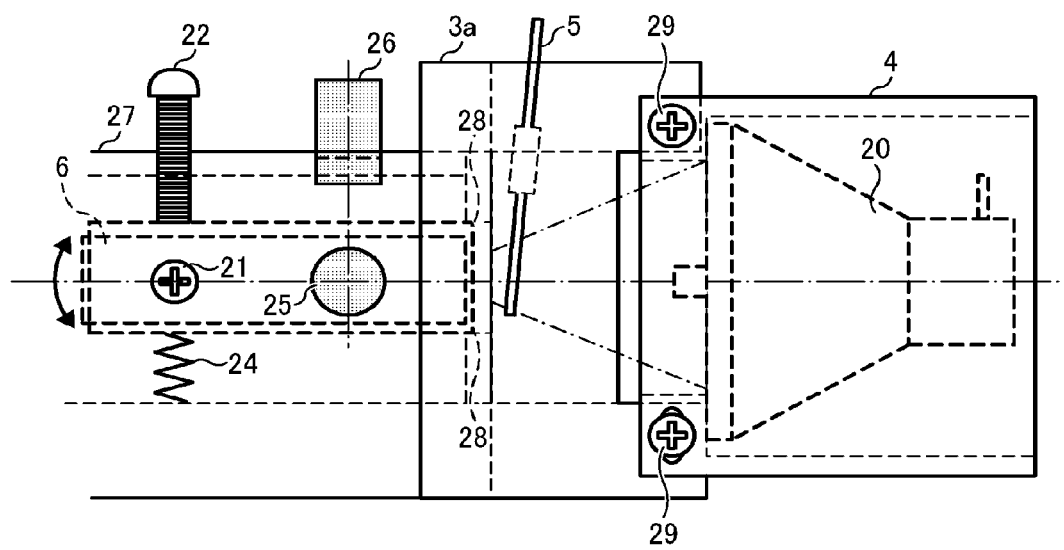
FIG. 9 is a partial upper view of the lighting unit and the light source unit.
Figure 10:
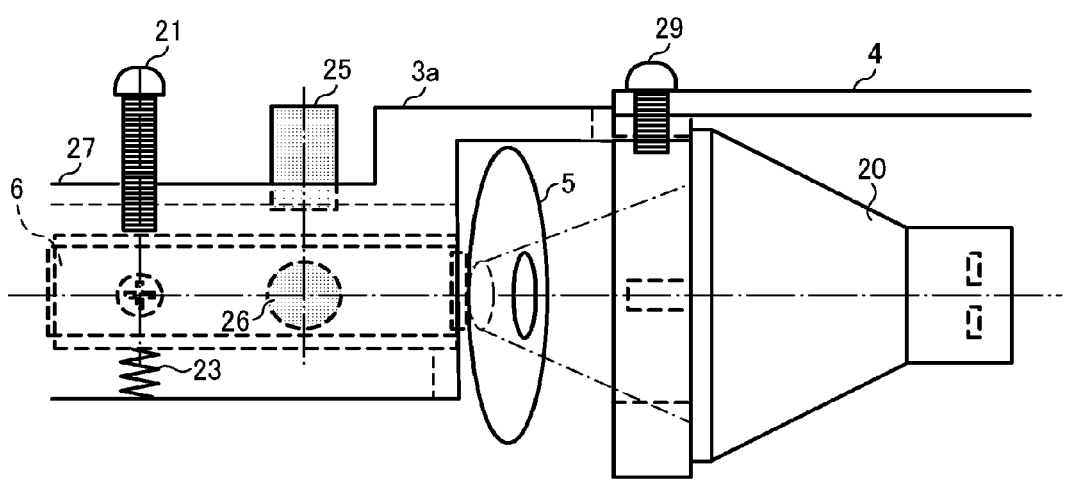
FIG. 10 is a partial side view of the lighting unit and the light source unit.

FIG. 9 is a partial upper view of the lighting unit 3*a* and the light source unit 4, and FIG. 10 is a partial side view of the lighting unit 3*a* and the light source unit 4.

As illustrated in FIGS. 9 and 10, when the first adjustment screw 21 and the second adjustment screw 22 are respectively screwed or unscrewed along the x and y directions, the first spring 23 and the second spring 24, respectively disposed at the opposite sides of the first adjustment screw 21 and the second adjustment screw 22, compress or expand, with which the light tunnel 6 can be adjusted along the x direction and the y direction. Further, as to the one or more example embodiments, one side of the light tunnel 6 facing the light source unit 4 is fixed at a fixing part 28. Further, as above described, the configuration to move the light tunnel 6 in the parallel direction can be devised. Further, the lighting unit 3*a* and the light source unit 4 can be fixed using a fixing member 29 as illustrated in FIGS. 9 and 10.

Figure 15:
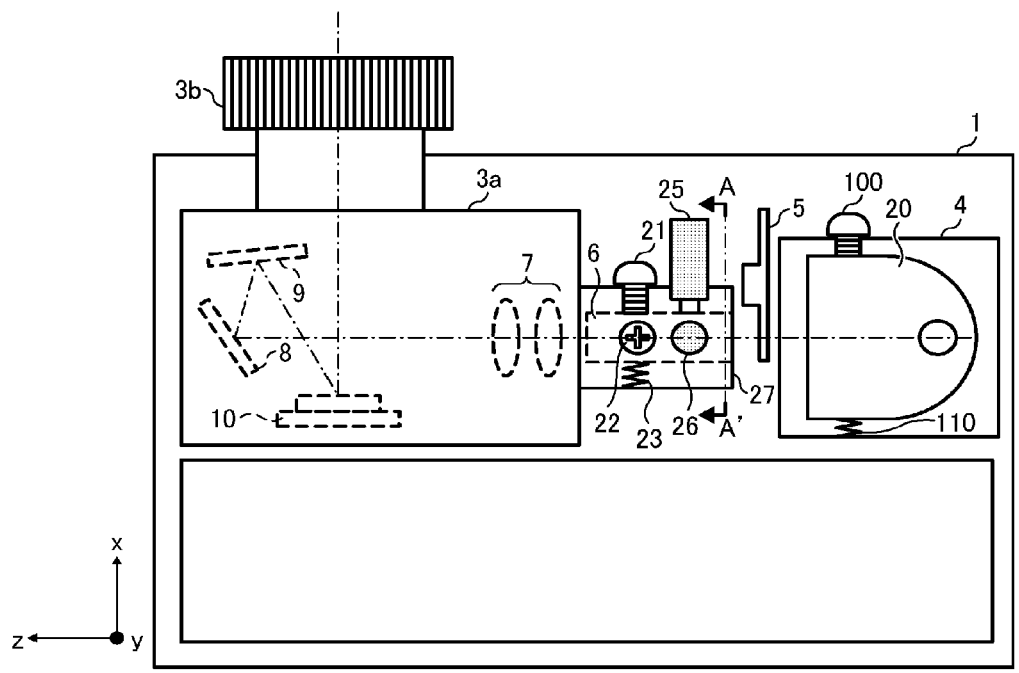
FIG. 15 is a schematic configuration of the image projection apparatus having a light source position adjustment unit disposed for the light source.

Further, as illustrated in FIG. 15, the image projection apparatus 1 can further include a light source position adjustment unit that can adjust a position of the light source 20 with respect to the light tunnel 6 of the lighting unit 3*a*. The light source position adjustment unit includes, for example, a third adjustment screw 100, and a third spring 110 similar to the above described adjustment screws and springs, and can function similar to the above described adjustment screws and springs. With this configuration, the relative position of the light source 20 with respect to the light tunnel 6 can be adjusted. Specifically, the relative position of the light source 20 with respect to the light tunnel 6 can be adjusted by adjusting a position of the light source 20 in the light source unit 4, or by adjusting a position of the light source unit 4 with respect to the lighting unit 3*a*. Further, if the image projection apparatus 1 includes the light source position adjustment unit, the light tunnel 6 can be fixed at a given position. Further, if the image projection apparatus 1 does not include the light source position adjustment unit, the relative position of the light source unit 4 (light source 20) with respect to the light tunnel 6 can be adjusted by adjusting an assembly position of the light source unit 4 (light source 20).

Figure 11:
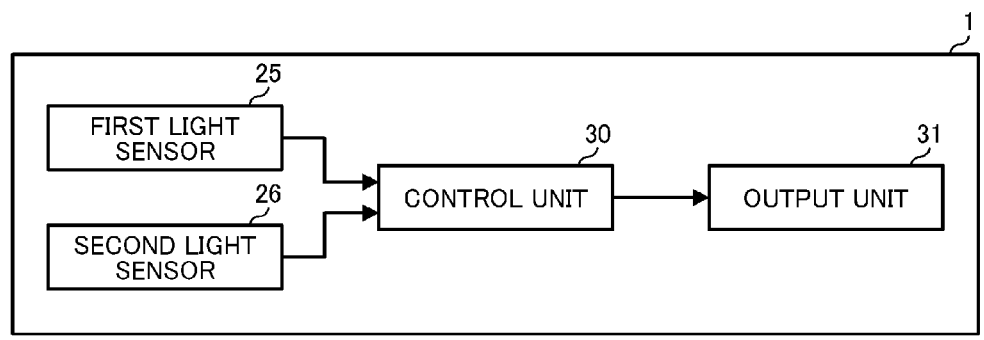
FIG. 11 is a block diagram of the image projection apparatus that performs controlling based on a detection result of the light sensor.

FIG. 11 is a block diagram of the image projection apparatus 1 that performs controlling based on a detection result of the light sensor. A controller 30 receives detection results from the first light sensor 25 and the second light sensor 26, and then the controller 30 determines whether the relative position of the light tunnel 6 and the light source 20 is at a suitable level, and then a determination result can be output, for example, to an output unit 31 such as an operation panel.

The controller 30 transmits and receives control signals with each of units in the image projection apparatus 1 to control the image projection apparatus 1 as a whole. Further, the controller 30 includes a central processing unit (CPU) used as a main processor, a read only memory (ROM) storing various control programs and settings, a memory such as synchronous dynamic random access memory (SDRAM) to temporarily store data for each processing, and a memory such as non-volatile RAM (NVRAM) to store data such as settings even when the power supply is OFF, wherein each of the units can be connected by a bus. The controller 30 and output unit 31 can be collectively configured as an output device.

Figure 14:
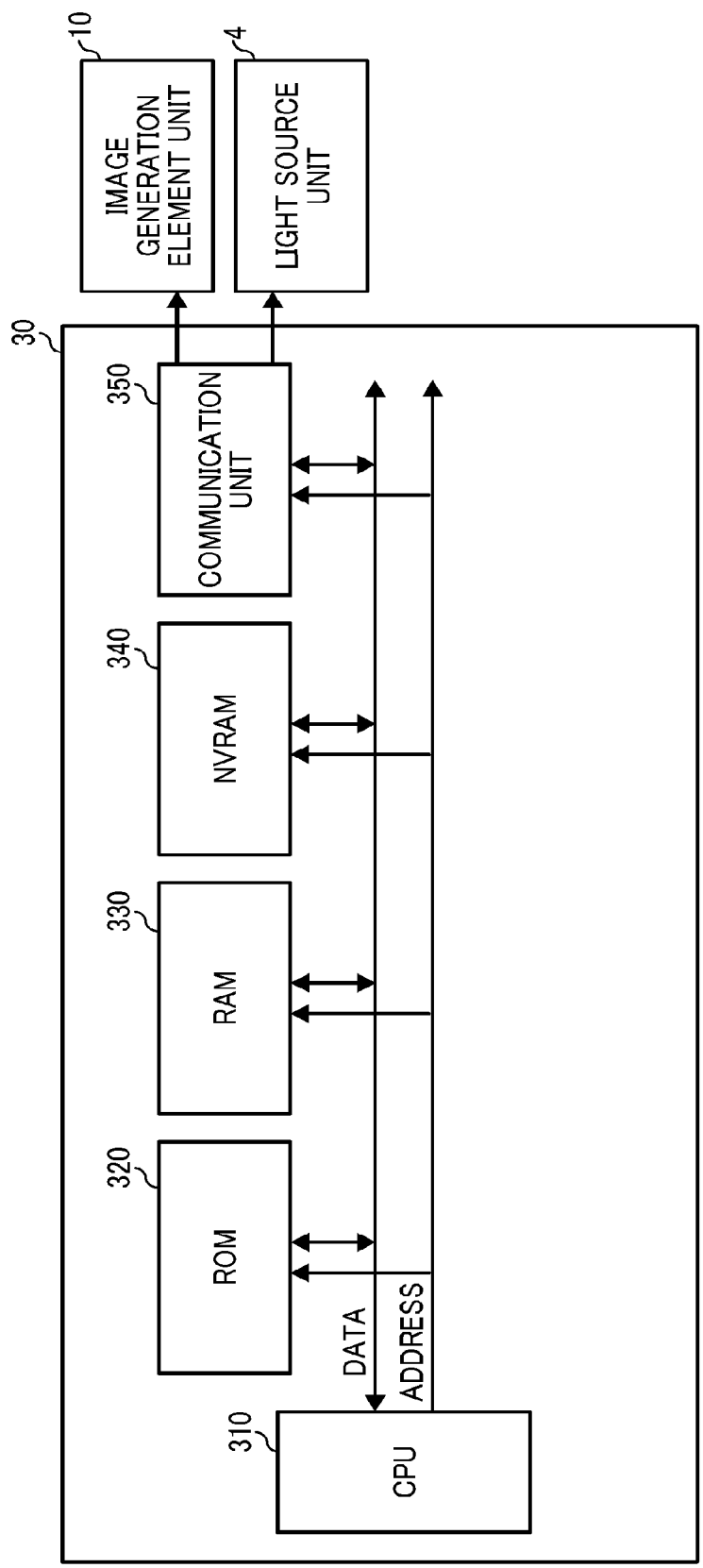
FIG. 14 is an example of a hardware configuration of a controller of the image projection apparatus.

FIG. 14 is an example of a hardware configuration of the controller 30 of the image projection apparatus 1. The controller 30 includes, for example, a central processing unit (CPU) 310, a read only memory (ROM) 320, a random access memory (RAM) 330, a non-volatile random access memory (NVRAM) 340, and a communication unit 350. The ROM 320 stores programs executable by the CPU 310. The RAM 330 is used as a working memory when executing the programs. The NVRAM 340 is a non-volatile memory that stores various settings and data of the image projection apparatus 1, and can store data even when a power supply is shutdown. The communication unit 350 is used to transmit computation results of the CPU 310, for example, to the light source unit 4, and the image generation element unit 10 including the DMD element 10*a* used as the light modulator.

Figure 12:
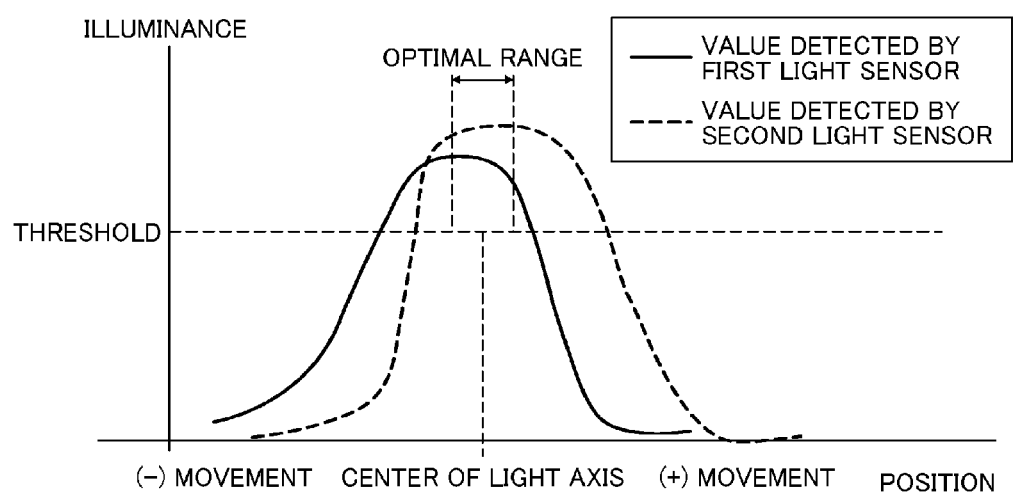
FIG. 12 is an example of a graph of detection values of luminance detected by the light sensor, and deviation of the relative position of the light tunnel and the center of the light axis of the light source.

FIG. 12 is an example of a graph of values of luminance detected by the light sensor, and deviation of the relative position of the light tunnel 6 and the center of the light axis of the light source 20. As illustrated in FIG. 12, when the deviation of the relative position of the light tunnel 6 and the center of the light axis of the light source 20 becomes greater, the detection value of the light sensor becomes lower, and when the deviation of the relative position of the light tunnel 6 and the center of the light axis of the light source 20 is within a suitable range, the detection value of the light sensor becomes higher, which means the light is utilized with higher efficiency. In this configuration, a position having the maximum detection value can be determined as an optimal position. Therefore, it can determine whether the relative position of the light tunnel 6 and the light source 20 is optimal based on the detection value of the light sensor.

In this example case, when the detection value of each of the two light sensors becomes a given threshold or more, and each of the detection values of the two light sensors is within a given range close to the maximum value, the given range close to the maximum value can be set as an optimal range of the relative position of the light tunnel 6 and the light source 20. Further, the optimal range of the relative position of the light tunnel 6 and the light source 20 can be set only when the detection values of the two light sensors become the given threshold or more.

Figure 13:
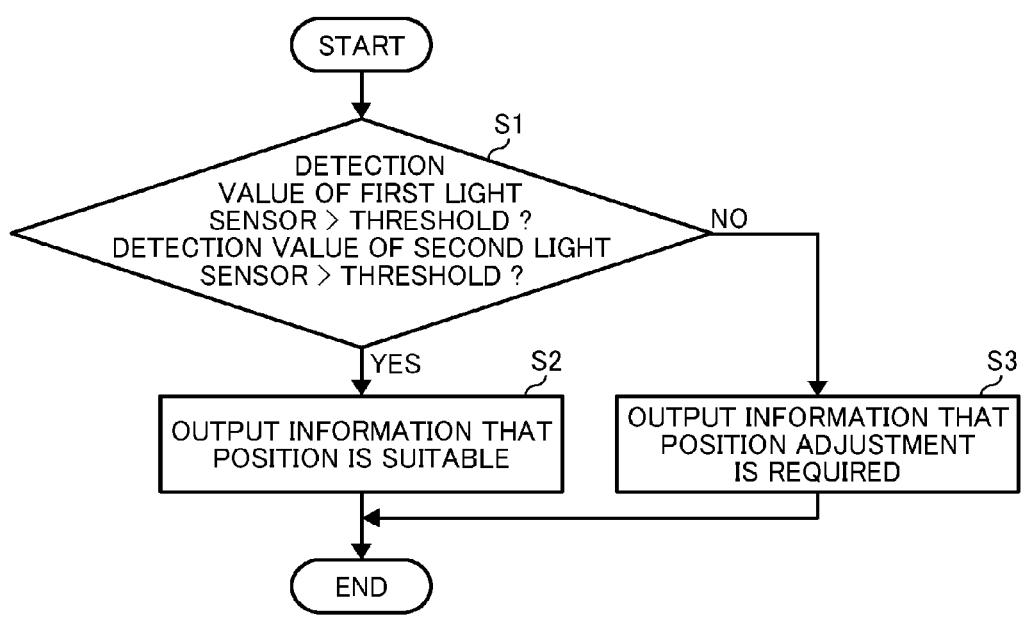
FIG. 13 is a flowchart showing the steps of a process of reporting a detection result of the light sensor.

FIG. 13 is a flowchart showing the steps of a process of reporting a detection result of the light sensor. As to the reporting process, it is determined whether a detection value of the first light sensor 25 is greater than a first threshold and a detection value of the second light sensor 26 is greater than a second threshold (step S1). The first threshold and second threshold may be set with the same value or different values.

If the detection value of the first light sensor 25 is greater than the first threshold and the detection value of the second light sensor 26 is greater than the second threshold (S1: YES), it is determined that the relative position of the light tunnel 6 and the light source 20 is optimal, and this result information is output or transmitted to the output unit 31 (step S2).

By contrast, if the detection value of one of the light sensors is not greater than the threshold such as the detection value of the first light sensor 25 is not greater than the first threshold or the detection value of the second light sensor 26 is not greater than the second threshold (S1: NO), warning is output or transmitted to the output unit 31 to report that a re-adjustment work is required for the relative position of the light tunnel 6 and the light source 20 (step S3), in which instead of reporting the warning, the detection value alone can be reported.

In the above described one or more example embodiments, the light sensor is disposed near the light tunnel 6 to detect the leak light leaked from the light tunnel 6, with which a level of the relative position of the light tunnel 6 and the light source 20 can be indicated by values of light intensity such as luminance. Further, it can determine whether the relative position of the light tunnel 6 and the light source 20 is optimal based on a detection value of the light sensor, and can output the result information, and then the light tunnel 6 can be adjusted to an optimal position, with which an optical layout pattern having enhanced light-use efficiency can be set easily.

Further, the light source position adjustment unit can be further disposed in the image projection apparatus 1 as above described. If enough light-use efficiency is not obtained only by adjusting the position of the light tunnel 6, the position of the light source 20 can be also adjusted by using the light source position adjustment unit, with which an optical layout having further enhanced light-use efficiency can be set. Further, when the light tunnel 6 is fixed, and the light source position adjustment unit is disposed in the image projection apparatus 1 as above described, an optical layout pattern having enhanced light-use efficiency can be set by adjusting the position of the light source 20.

In the above described one or more example embodiments, even if the position of the light source is required to be adjusted, the position of the light source can be adjusted at a user site without sending back the image projection apparatus 1 to a factory. Further, the image projection apparatus 1 can be disposed with a plurality of light sensors to detect the leak light in the x direction and the y direction of the light tunnel 6, with which a position having the enhanced light-use efficiency can be preferably detected.

Further, the light sensor is preferably a sensor having sensitivity to visible light, which is a main component of the leak light, with which a sensor that detects general wavelength ranges can be used. Further, specific spectrum property can be set for the mirror of the light tunnel 6 so that the light having a given wavelength range can be leaked from the light tunnel 6, and a sensor having sensitivity to this wavelength range is disposed, with which the light having only the specific wavelength can be detected correctly without the effect of ambient light.

Since the image projection apparatus 1 includes internal parts to become high temperature and high luminance such as the light source, the adjustment work of the image projection apparatus 1 exposing the internal parts cannot be performed at user sites due to the safety reasons. By employing the above described configuration of the one or more example embodiments, the detection value of the light sensor can be used to compute a change of the lamp power between the shipments from the factory to the current date while projecting images at the user sites without using a special detector such as a luminance measurement device.

As to the above described example embodiments of the lighting apparatus, the light detector is disposed near the light equalizer to detect light leak from the light equalizer. With this configuration, it can detect whether the light source and the light equalizer are set at positions that can utilize the light emitted from the light source efficiently.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The computer software can be provided to the programmable device using any storage medium or carrier medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), SD card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium or apparatus of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A lighting apparatus to focus light emitted from a light source onto an image generation element comprising:
    a light equalizer configured to receive the light emitted from the light source, equalize the received light by reflecting the received light on an inner face of the light equalizer, and exit the equalized light, the light equalizer having an inlet for receiving the light emitted from the light source and an outlet from which the equalized light exits the light equalizer, and a side surface, wherein the inlet and the outlet share a common axis that runs through the light equalizer, and
    a light detector having a light detecting surface that faces the side surface of the light equalizer in a direction perpendicular to the common axis that runs through the light equalizer and configured to detect light intensity of leak light leaked from the light equalizer.

2. The lighting apparatus of claim 1, further comprising a position adjustment unit configured to adjust a position of the light equalizer with respect to a light axis of the light emitted from the light source.

3. The lighting apparatus of claim 1, wherein the light detector includes a first light detector and a second light detector, wherein a direction of the light axis of the light emitted from the light source is set as "z" direction, a direction of one plane perpendicular to the light axis of the light emitted from the light source is set as "x" direction, a direction of another plane perpendicular to the light axis of the light emitted from the light source is set as "y" direction, and the x, y, and z directions are set perpendicular one to another,
    wherein the first light detector detects the leak light leaked from the light equalizer along the x direction,
    wherein the second light detector detects the leak light leaked from the light equalizer along the y direction.

4. The lighting apparatus of claim 1, wherein the light detector is configured to detect visible light.

5. The lighting apparatus of claim 1, wherein the light equalizer has the inner face having a spectrum property that light having a predetermined wavelength range, leaks from the light equalizer as the leak light, and the light detecting surface of the light detector has sensitivity to light having the predetermined wavelength range.

6. An image projection apparatus comprising:
    a light source configured to emit light;
    the lighting apparatus of claim 1 configured to guide the light emitted from the light source onto an image generation element to generate an image using the light emitted from the light source: and
    an optical projection apparatus configured to project the image generated by the image generation element onto a projection face.

7. The image projection apparatus of claim 6, further comprising a light source position adjustment unit configured to adjust a position of the light source with respect to the light equalizer.

8. The image projection apparatus of claim 7 further comprising an output device configured to output information reporting that a relative positional relationship of the light equalizer and the light source is required to be adjusted when the light detector detects a threshold value or less.

9. The lighting apparatus of claim 1, further comprising a cover that surrounds the side surface of the light equalizer and that is configured to shield the side surface of the light equalizer from ambient light, the cover including an opening through which the light detector is inserted such that the light detecting surface is disposed within a space created between the light equalizer side surface and the cover.

* * * * *